US012014745B2

(12) United States Patent
Bruhn et al.

(10) Patent No.: US 12,014,745 B2
(45) **Date of Patent: *Jun. 18, 2024**

(54) TRANSFORMING AUDIO SIGNALS CAPTURED IN DIFFERENT FORMATS INTO A REDUCED NUMBER OF FORMATS FOR SIMPLIFYING ENCODING AND DECODING OPERATIONS

(71) Applicants: Dolby Laboratories Licensing Corporation, San Francisco, CA (US); Dolby International AB, Amsterdam (NL)

(72) Inventors: Stefan Bruhn, Sollentuna (SE); Michael Eckert, Ashfield (AU); Juan Felix Torres, Darlinghurst (AU); Stefanie Brown, Lewisham (AU); David S. McGrath, Rose Bay (AU)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/882,900

(22) Filed: Aug. 8, 2022

(65) Prior Publication Data

US 2022/0375482 A1 Nov. 24, 2022

Related U.S. Application Data

(63) Continuation of application No. 16/973,030, filed as application No. PCT/US2019/055009 on Oct. 7, 2019, now Pat. No. 11,410,666.

(Continued)

(51) Int. Cl.
*G10L 19/008* (2013.01)
*H04S 3/00* (2006.01)

(52) U.S. Cl.
CPC ............ *G10L 19/008* (2013.01); *H04S 3/008* (2013.01); *H04S 2400/01* (2013.01)

(58) Field of Classification Search
CPC ..... G10L 19/008; G10L 19/167; G10L 19/20; H04S 2420/03; H04S 2400/03; H04S 2400/01

(Continued)

(56) References Cited

U.S. PATENT DOCUMENTS 9,361,898 B2 6/2016 Erik
9,530,421 B2 12/2016 Jot (Continued)

FOREIGN PATENT DOCUMENTS

CN 102422348 B 9/2013
CN 103871415 B 8/2017

(Continued)

OTHER PUBLICATIONS

Arnault Nagle: "Enrichissement de la Conference Audio en voix sur IP au travers de l'amelioration de la qualite et de la spatialisation sonore" Apr. 7, 2008.

*Primary Examiner* — Alexander Krzystan

(57) ABSTRACT

The disclosed embodiments enable converting audio signals captured in various formats by various capture devices into a limited number of formats that can be processed by an audio codec (e.g., an Immersive Voice and Audio Services (IVAS) codec). In an embodiment, a simplification unit of the audio device receives an audio signal captured by one or more audio capture devices coupled to the audio device. The simplification unit determines whether the audio signal is in a format that is supported/not supported by an encoding unit of the audio device. Based on the determining, the simplification unit, converts the audio signal into a format that is supported by the encoding unit. In an embodiment, if the simplification unit determines that the audio signal is in a (Continued)

spatial format, the simplification unit can convert the audio signal into a spatial "mezzanine" format supported by the encoding.

20 Claims, 7 Drawing Sheets

Related U.S. Application Data

(60) Provisional application No. 62/742,729, filed on Oct. 8, 2018.

(58) Field of Classification Search
USPC .................. 381/22, 23, 307, 11, 12; 700/94
See application file for complete search history.

(56) References Cited

U.S. PATENT DOCUMENTS

| | | | | |
|---|---|---|---|---|
| 9,560,467 | B2 | 1/2017 | Gorzel | |
| 9,622,010 | B2 | 4/2017 | Hooks | |
| 9,774,974 | B2 | 9/2017 | Yoo | |
| 9,794,721 | B2 | 10/2017 | Goodwin | |
| 9,955,278 | B2 | 4/2018 | Fersch | |
| 11,217,257 | B2 | 1/2022 | Li | |
| 11,410,666 | B2 | 8/2022 | Bruhn | |
| 2006/0026302 | A1* | 2/2006 | Bennett | H04N 21/64769 348/E7.071 |
| 2008/0319764 | A1 | 12/2008 | Nagle | |
| 2009/0192638 | A1 | 7/2009 | Van Leest | |
| 2010/0268836 | A1* | 10/2010 | Jabri | H04L 65/765 709/231 |
| 2012/0054664 | A1 | 3/2012 | Dougall | |
| 2016/0099001 | A1 | 4/2016 | Peters | |
| 2016/0240183 | A1* | 8/2016 | Noh | H04R 3/04 |
| 2017/0076735 | A1 | 3/2017 | Beack | |
| 2017/0365265 | A1* | 12/2017 | Zhang | G10L 19/008 |
| 2018/0233157 | A1 | 8/2018 | Kim | |
| 2020/0037014 | A1 | 1/2020 | Dahl | |

FOREIGN PATENT DOCUMENTS

| | | | |
|---|---|---|---|
| CN | 104429102 | B | 12/2017 |
| CN | 107533843 | B | 6/2021 |
| EP | 2309497 | A2 | 4/2011 |
| EP | 2873254 | | 5/2015 |
| JP | 2009109674 | A | 5/2009 |
| KR | 20050076088 | A | 7/2005 |
| WO | 2009015461 | A1 | 2/2009 |
| WO | 2013050184 | A1 | 4/2013 |
| WO | 2016123572 | | 8/2016 |
| WO | 2016204579 | A1 | 12/2016 |
| WO | 2017132082 | A1 | 8/2017 |
| WO | 2018027067 | A1 | 2/2018 |
| WO | 2018152004 | A1 | 8/2018 |

* cited by examiner

TRANSFORMING AUDIO SIGNALS CAPTURED IN DIFFERENT FORMATS INTO A REDUCED NUMBER OF FORMATS FOR SIMPLIFYING ENCODING AND DECODING OPERATIONS

CROSS-REFERENCE TO RELATED APPLICATIONS

This application is a continuation of U.S. patent application Ser. No. 16/973,030, filed 7 Dec. 2020, which is a national stage application of International Application No. PCT/US2019/055009, filed 7 Oct. 2019, which claims the benefit of priority from U.S. Provisional Patent Application No. 62/742,729 filed 8 Oct. 2018, each of which is hereby incorporated by reference in its entirety.

TECHNOLOGY

Embodiments of the present disclosure generally relate to audio signal processing, and more specifically, to distribution of captured audio signals.

BACKGROUND

Voice and video encoder/decoder ("codec") standard development has recently focused on developing a codec for Immersive Voice and Audio Services (IVAS). IVAS is expected to support a range of service capabilities, such as operation with mono to stereo to fully immersive audio encoding, decoding and rendering. A suitable IVAS codec also provides a high error robustness to packet loss and delay jitter under different transmission conditions. IVAS is intended to be supported by a wide range of devices, endpoints, and network nodes, including but not limited to mobile and smart phones, electronic tablets, personal computers, conference phones, conference rooms, virtual reality and augmented reality devices, home theatre devices, and other suitable devices. Because these devices, endpoints and network nodes can have various acoustic interfaces for sound capture and rendering, it may not be practical for an IVAS codec to address all the various ways in which an audio signal is captured and rendered.

SUMMARY

The disclosed embodiments enable converting audio signals captured in various formats by various capture devices into a limited number of formats that can be processed by a codec, e.g., an IVAS codec.

In some embodiments, a simplification unit built into an audio device receives an audio signal. That audio signal can be a signal captured by one or more audio capture devices coupled with the audio device. The audio signal can be, for example, an audio of a video conference between people at different locations. The simplification unit determines whether the audio signal is in a format that is not supported by an encoding unit of the audio device, commonly referred to as an "encoder." For example, the simplification unit can determine whether or not the audio signal is in a mono, stereo, or a standard or proprietary spatial format. Based on determining that the audio signal is in a format that is not supported by the encoding unit, the simplification unit, converts the audio signal into a format that is supported by the encoding unit. For example, if the simplification unit determines that the audio signal is in a proprietary spatial format, the simplification unit can convert the audio signal into a spatial "mezzanine" format supported by the encoding unit. The simplification unit transfers the converted audio signal to the encoding unit.

An advantage of the disclosed embodiments is that the complexity of a codec, e.g., an IVAS codec, can be reduced by reducing a potentially large number of audio capture formats into a limited number of formats, e.g., mono, stereo, and spatial. As a result, the codec can be deployed on a variety of devices irrespective of the audio capture capabilities of the devices.

These and other aspects, features, and embodiments can be expressed as methods, apparatus, systems, components, program products, means or steps for performing a function, and in other ways.

In some implementations, a simplification unit of an audio device receives an audio signal in a first format. The first format is one out of a set of multiple audio formats supported by the audio device. The simplification unit determines whether the first format is supported by an encoder of the audio device. In accordance with the first format not being supported by the encoder, the simplification unit converts the audio signal into a second format that is supported by the encoder. The second format is an alternative representation of the first format. The simplification unit transfers the audio signal in the second format to the encoder. The encoder encodes the audio signal. The audio device stores the encoded audio signal or transmitting the encoded audio signal to one or more other devices. Converting the audio signal into the second format can include generating metadata for the audio signal. The metadata can include a representation of a portion of the audio signal. Encoding the audio signal can include encoding the audio signal in the second format into a transport format supported by a second device. The audio device can transmit the encoded audio signal by transmitting the metadata that comprises a representation of a portion of the audio signal not supported by the second format.

In some implementations, determining, by the simplification unit, whether the audio signal is in the first format can include determining a number of audio capture devices and a corresponding position of each capture device used to capture the audio signal. Each of the one or more other devices can be configured to reproduce the audio signal from the second format. At least one of the one or more other devices may not be capable of reproducing the audio signal from the first format.

The second format can represent the audio signal as a number of audio objects in an audio scene both of which are relying on a number of audio channels for carrying spatial information. The second format can include metadata for carrying a further portion of spatial information. The first format and the second format can both bee spatial audio formats. The second format can be a spatial audio format and the first format can be a mono format associated with metadata or a stereo format associated with metadata. The set of multiple audio formats supported by the audio device can include multiple spatial audio formats. The second format can be an alternative representation of the first format and is further characterized in enabling a comparable degree of Quality of Experience.

In some implementations, a render unit of an audio device receives an audio signal in a first format. The render unit determines whether the audio device is capable of reproducing the audio signal in the first format. In response to determining that the audio device is uncapable of reproducing the audio signal in the first format, the render unit adapts, the audio signal to be available in a second format. The render unit transfers the audio signal in the second format for rendering.

In some implementations, converting, by the render unit, the audio signal into the second format can include using metadata that includes a representation of a portion of the audio signal not supported by a fourth format used for encoding in combination with the audio signal in a third format. Here, the third format corresponds to the term "first format" in the context of the simplification unit, which is one out of a set of multiple audio formats supported at the encoder side. The fourth format corresponds to the term "second format" in the context of the simplification unit, which is a format that is supported by the encoder, and which is an alternative representation of the third format. Here and elsewhere in this specification, the terms first, second, third and fourth are used for identification and are not necessarily indicative of a particular order.

A decoding unit receives the audio signal in a transport format. The decoding unit decodes the audio signal in the transport format into the first format, and transfers the audio signal in the first format to the render unit. In some implementations, adapting of the audio signal to be available in the second format can include adapting the decoding to produce the received audio in the second format. In some implementations, each of multiple devices is configured to reproduce the audio signal in the second format. One or more of the multiple devices are not capable of reproducing the audio signal in the first format.

In some implementations, a simplification unit receives, from an acoustic pre-processing unit, audio signals in multiple formats. The simplification unit receives, from a device, attributes of the device, the attributes including indications of one or more audio formats supported by the device. The one or more audio formats include at least one of a mono format, a stereo format, or a spatial format. The simplification unit converts the audio signals into an ingest format that is an alternative representation of the one or more audio formats. The simplification unit provides the converted audio signal to an encoding unit for downstream processing. Each of the acoustic pre-processing unit, the simplification unit, and the encoding unit can include one or more computer processors.

In some implementations, an encoding system includes a capture unit configured to capture an audio signal, an acoustic pre-processing unit configured to perform operations comprising pre-process the audio signal, an encoder and a simplification unit. The simplification unit is configured to perform the following operations. The simplification unit receives, from the acoustic pre-processing unit, an audio signal in a first format. The first format is one out of a set of multiple audio formats supported by the encoder. The simplification unit determines whether the first format is supported by the encoder. In response to determining that the first format is not supported by the encoder, the simplification unit converts the audio signal into a second format that is supported by the encoder. The simplification unit transfers the audio signal in the second format to the encoder. The encoder is configured to perform operations including encoding the audio signal and at least one of storing the encoded audio signal or transmitting the encoded audio signal to another device.

In some implementations, converting the audio signal into the second format includes generating metadata for the audio signal. The metadata can include a representation of a portion of the audio signal not supported by the second format. The operations of the encoder can further include transmitting the encoded audio signal by transmitting the metadata that includes a representation of a portion of the audio signal not supported by the second format.

In some implementations, the second format represents the audio signal audio as a number of objects in an audio scene and a number of channels for carrying spatial information. In some implementations, pre-processing the audio signal can include one or more of performing noise cancellation, performing echo cancellation, reducing a number of channels of the audio signal, increasing the number of audio channels of the audio signal, or generating acoustic metadata.

In some implementations, a decoding system includes a decoder, a render unit, and a playback unit. The decoder is configured to perform operations including, for example, decoding an audio signal from a transport format into a first format. The render unit is configured to perform the following operations. The render unit receives the audio signal in the first format. The render unit determines whether or not an audio device is capable of reproducing the audio signal in a second format. The second format enables use of more output devices than the first format. In response to determining that the audio device is capable of reproducing the audio signal in the second format, the render unit converting the audio signal into the second format. The render unit renders the audio signal in the second format. The playback unit is configured to perform operations including initiating playing of the rendered audio signal on a speaker system.

In some implementations, converting the audio signal into the second format can include using metadata that includes a representation of a portion of the audio signal not supported by a fourth format used for encoding in combination with the audio signal a third format. Here, the third format corresponds to the term "first format" in the context of the simplification unit, which is one out of a set of multiple audio formats supported at the encoder side. The fourth format corresponds to the term "second format" in the context of the simplification unit, which is a format that is supported by the encoder, and which is an alternative representation of the third format.

In some implementations, the operations of the decoder can further include receiving the audio signal in a transport format and transferring the audio signal in the first format to the render unit.

These and other aspects, features, and embodiments will become apparent from the following descriptions, including the claims.

BRIEF DESCRIPTION OF THE DRAWINGS

In the drawings, specific arrangements or orderings of schematic elements, such as those representing devices, units, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in some embodiments.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths, as may be needed, to affect the communication.

DETAILED DESCRIPTION

In the following description, for the purposes of explanation, numerous specific details are set forth to provide a thorough understanding of the present disclosure. It will be apparent, however, that the present disclosure may be practiced without these specific details.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, and circuits, have not been described in detail so as not to unnecessarily obscure aspects of the embodiments. Several features are described hereafter that can each be used independently of one another or with any combination of other features.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on."

Figure 1:
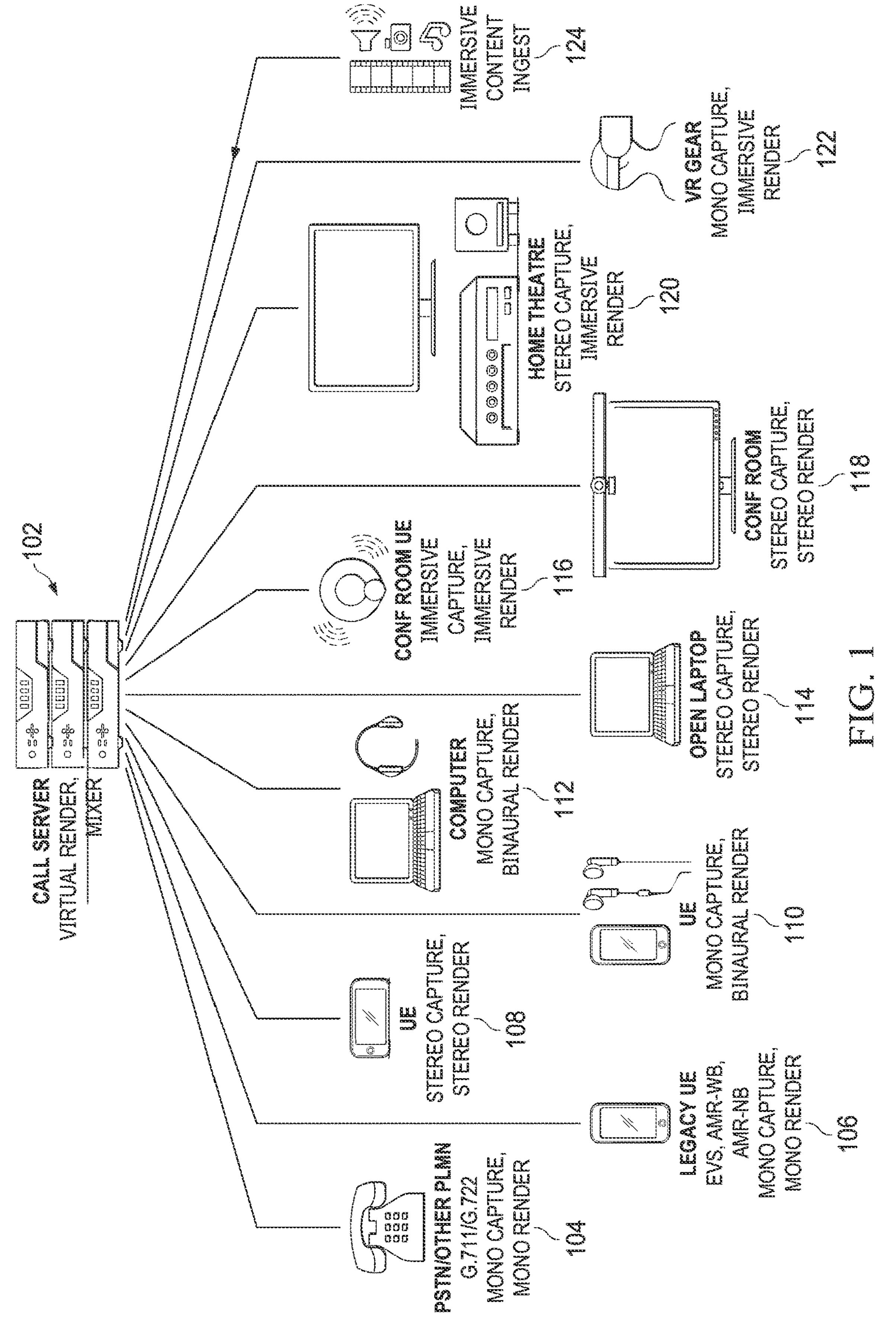
FIG. 1 illustrates various devices that can be supported by the IVAS system, in accordance with some embodiments of the present disclosure.

FIG. 1 illustrates various devices that can be supported by the IVAS system. In some implementations, these devices communicate through call server 102 that can receive audio signals from, for example, a public switched telephone network (PSTN) or a public land mobile network device (PLMN) illustrated by PSTN/OTHER PLMN device 104. This device can use G.711 and/or G.722 standard for audio (speech) compression and decompression. A device 104 is generally able to capture and render mono audio only. The IVAS system is enabled to also support legacy user equipment 106. Those legacy devices can include enhanced voice services (EVS) devices, adaptive multi-rate wideband (AMR-WB) speech to audio coding standard supporting devices, adaptive multi-rate narrowband (AMR-NB) supporting devices and other suitable devices. These devices usually render and capture audio in mono only.

The IVAS system is also enabled to support user equipment that captures and renders audio signals in various formats including advanced audio formats. For example, the IVAS system is enabled to support stereo capture and render devices (e.g., user equipment 108, laptop 114, and conference room system 118), mono capture and binaural render devices (e.g., user device 110 and computer device 112), immersive capture and render devices (e.g., conference room use equipment 116), stereo capture and immersive render devices (e.g., home theater 120), mono capture and immersive render (e.g., virtual reality (VR) gear 122), immersive content ingest 124, and other suitable devices. To support all these formats directly, the codec for the IVAS system would need to be very complex and expensive to install. Thus, a system for simplifying the codec prior to the encoding stage would be desirable.

Although, description that follows is focused on an IVAS system and codec, the disclosed embodiments are applicable to any codec for any audio system where there is an advantage in reducing a large number of audio capture formats to a smaller number to reduce the complexity of the audio codec or for any other desired reason.

Figure 2A:
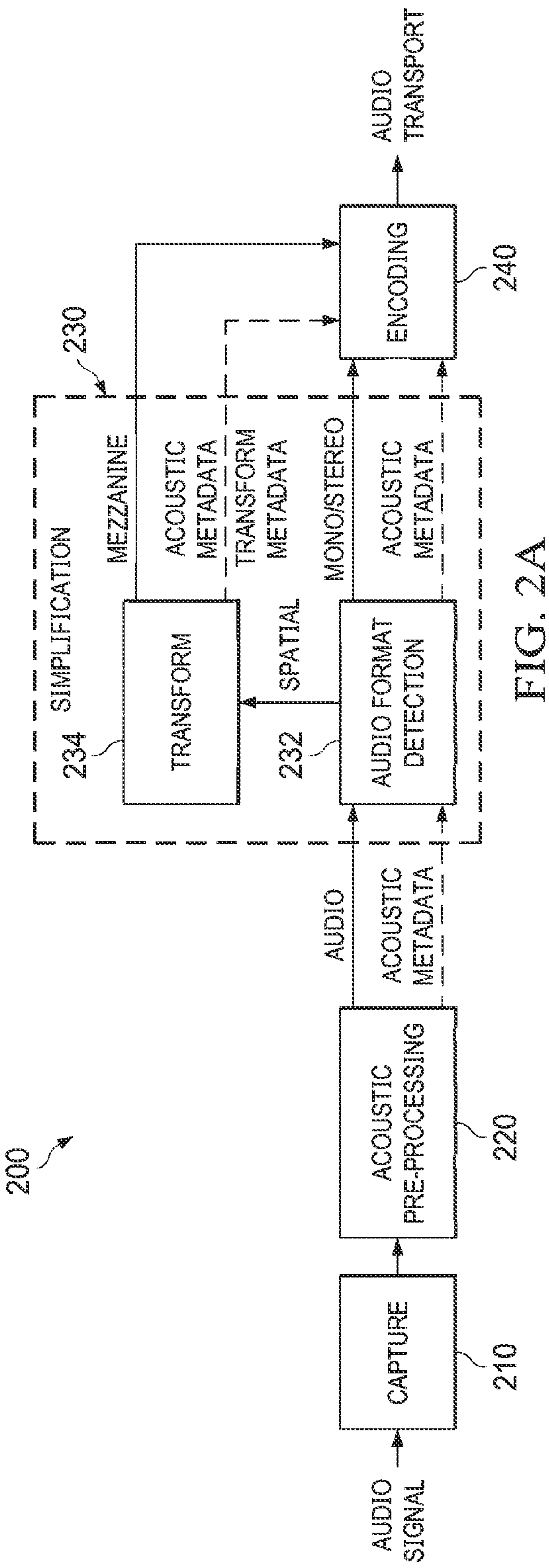
FIG. 2A is a block diagram of a system for transforming captured audio signal into a format ready for encoding, in accordance with some embodiments of the present disclosure.

FIG. 2A is a block diagram of a system 200 for transforming captured audio signals into a format ready for encoding, in accordance with some embodiments of the present disclosure. Capture unit 210 receives an audio signal from one or more capture devices, e.g., microphones. For example, the capture unit 210 can receive an audio signal from one microphone (e.g., mono signal), from two microphones (e.g., stereo signal), from three microphones, or from another number and configuration of audio capture devices. The capture unit 210 can include customizations by one or more third parties, where the customizations can be particular to the capture devices used.

In some implementations, a mono audio signal is captured with one microphone. The mono signal can be captured, for example, with PSTN/PLMN phone 104, legacy user equipment 106, user device 110 with a hands-free headset, computer device 112 with a connected headset, and virtual reality gear 122, as illustrated in FIG. 1.

In some implementations, the capture unit 210 receives stereo audio captured using various recording/microphone techniques. Stereo audio can be captured by, for example, user equipment 108, laptop 114, conference room system 118, and home theater 120. In one example, stereo audio is captured with two directional microphones at the same location placed at a spread angle of about ninety degrees or more. The stereo effect results from inter-channel level differences. In another example, the stereo audio is captured by two spatially displaced microphones. In some implementations, the spatially displaced microphones are omni-directional microphones. The stereo effect in this configuration results from inter-channel level and inter-channel time differences. The distance between the microphones has considerable influence on the perceived stereo width. In yet another example, the audio is captured with two directional microphones with a seventeen centimeter displacement and a spread angle of one hundred and ten degrees. This system is often referred to as an Office de Radiodiffusion Télévision Française ("ORTF") stereo microphone system. Yet another stereo capture system includes two microphones with different characteristics that are arranged such that one microphone signal is the mid signal and the other the side signal. This arrangement is often referred to as the mid-side (M/S) recording. The stereo effect of signals from M/S builds typically on inter-channel level differences.

In some implementations, the capture unit 210 receives audio captured using multi-microphone techniques. In these implementations, the capture of audio involves an arrangement of three or more microphones. This arrangement is generally required for capturing spatial audio and may also be effective to perform ambient noise suppression. As the number of microphones increases, the number of details of a spatial scene that can be captured by the microphones increases as well. In some instances, the accuracy of the captured scene is improved as well when the number of microphones increases. For example, various user equipment (UE) of FIG. 1 operated in hands-free mode can utilize multiple microphones to produce a mono, stereo or spatial audio signal. Moreover, an open laptop computer 114 with multiple microphones can be used to produce a stereo capture. Some manufacturers release laptop computers with two to four Micro-Electro-Mechanical Systems ("MEMS") microphones allowing stereo capture. Multi-microphone immersive audio capture can be implemented, for instance, in conference room user equipment 216.

The captured audio generally undergoes a pre-processing stage before being ingested into a voice or audio codec. Thus, acoustic pre-processing unit 220 receives an audio signal from the capture unit 210. In some implementations, the acoustic pre-processing unit 220 performs noise and echo cancellation processing, channel down-mix and up-mix (e.g., reducing or increasing a number of audio channels), and/or any kind of spatial processing. The audio signal output of the acoustic pre-processing unit 220 is generally suitable for encoding and transmission to other devices. In some implementations, the specific design of the acoustic pre-processing unit 220 is performed by a device manufacturer as it depends on the specifics of the audio capture with a particular device. However, requirements set by pertinent acoustic interface specifications can set limits for these designs and ensure that certain quality requirements are met. The acoustic pre-processing is performed with a purpose of producing one or more different kinds of audio signals or audio input formats that an IVAS codec supports to enable the various IVAS target use cases or service levels. Depending on specific IVAS service requirements associated with these use cases, an IVAS codec may be required to support of mono, stereo and spatial formats.

Generally, the mono format is used when it is the only format available, e.g., based on the type of capture device, for instance, if the capture capabilities of the sending device are limited. For stereo audio signals, the acoustic pre-processing unit 220 converts the captured signals into a normalized representation meeting specific conventions (e.g., channel ordering Left-Right convention). For M/S stereo capture, this process can involve, for example, a matrix operation so that the signal is represented using the Left-Right convention. After pre-processing, the stereo signal meets certain conventions (e.g., Left-Right convention). However, information about specific stereo capture devices (e.g., microphone number and configuration) is removed.

For spatial formats, the kind of spatial input signals or specific spatial audio formats obtained after acoustic pre-processing may depend on the sending device type and its capabilities for capturing audio. At the same time, the spatial audio formats that may be required by the IVAS service requirements include low resolution spatial, high resolution spatial, metadata-assisted spatial audio (MASA) format, and the Higher Order Ambisonics ("HOA") transport format (HTF) or even further spatial audio formats. The acoustic pre-processing unit 220 of a sending device with spatial audio capabilities, thus, must be prepared to provide a spatial audio signal in proper format meeting these requirements.

The Low-resolution spatial formats include spatial-WXY, First Order Ambisonics ("FOA") and other formats. The spatial-WXY format relates to a three-channel first-order planar B-format audio representation, with omitted height component (Z). This format is useful for bit rate efficient immersive telephony and immersive conferencing scenarios where spatial resolution requirements are not very high and where the spatial height component can be considered irrelevant. The format is especially useful for conference phones as it enables receiving clients to perform immersive rendering of the conference scene captured in a conference room with multiple participants. Likewise, the format is of use for conference servers that spatially arrange conference participants in a virtual meeting room. By contrast, FOA contains the height component (Z) as the 4th component signal. FOA representations are relevant for low-rate VR applications.

High-resolution spatial formats include channel, object, and scene-based spatial formats. Depending on the number of involved audio component signals, each of these formats allows spatial audio to be represented with virtually unlimited resolution. For various reasons (e.g., bit rate limitations and complexity limitations), however, there are practical limitations to relatively few component signals (e.g. twelve). Further spatial formats include or may rely on MASA or HTF formats.

Requiring a device that supports IVAS to support the large number and variety of audio input formats discussed above can result in substantial cost in terms of complexity, memory footprint, implementation testing, and maintenance. However, not all devices will have the capability or would benefit from supporting all audio formats. For example, there may be IVAS-enabled devices that support only stereo, but do not support spatial capture. Other devices may only support low-resolution spatial input, while a further class of devices may support HOA capture only. Thus, different devices would only make use of certain subsets of the audio formats. Therefore, if the IVAS codec had to support direct coding of all audio formats, the IVAS codec would become unnecessarily complex and expensive.

To solve this problem, system 200 of FIG. 2A includes a simplification unit 230. The acoustic pre-processing unit 220 transfers the audio signal to simplification unit 130. In some implementations, the acoustic pre-processing unit 220 generates acoustic metadata that is transferred to the simplification unit 230 together with the audio signal. The acoustic metadata can include data related to the audio signal (e.g., format metadata such as mono, stereo, spatial). The acoustic metadata can also include noise cancellation data and other suitable data, e.g. related to the physical or geometrical properties of the capture unit 210.

The simplification unit 230 converts various input formats supported by a device to a reduced common set of codec ingest formats. For example, the IVAS codec can support three ingest formats: mono, stereo, and spatial. While mono and stereo formats are similar or identical to the respective formats as produced by the acoustic pre-processing unit, the spatial format can be a "mezzanine" format. A mezzanine format is a format that can accurately represent any spatial audio signal obtained from the acoustic pre-processing unit 220 and discussed above. This includes spatial audio represented in any channel, object, and scene-based format (or combination thereof). In some implementations the mezzanine format can represent the audio signal as a number of objects in an audio scene and a number of channels for carrying spatial information for that audio scene. In addition, the mezzanine format can represent MASA, HTF or other spatial audio formats. One suitable spatial mezzanine format can represent spatial audio as m Objects and n-th order HOA ("mObj+HOAn"), where m and n are low integer numbers, including zero.

Figure 3:
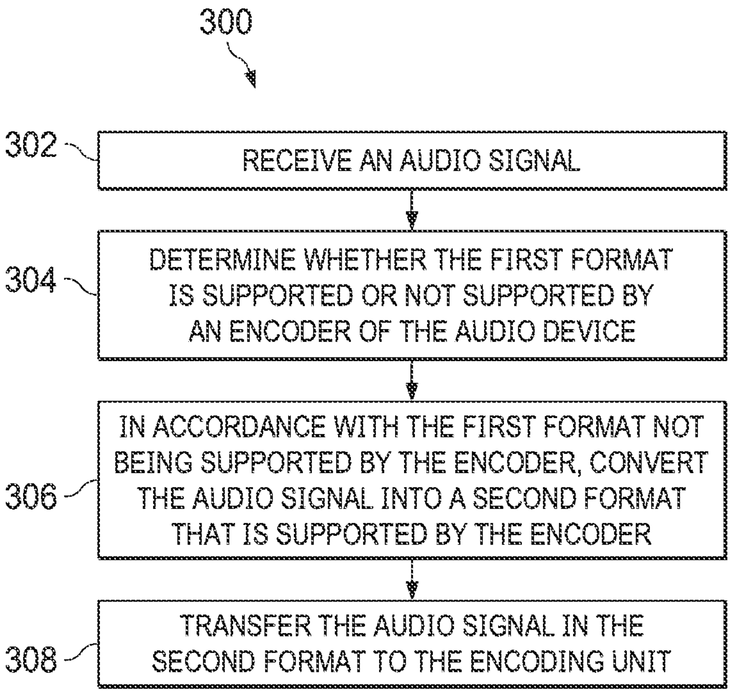
FIG. 3 is a flow diagram of exemplary actions for transforming an audio signal to a format supported by an encoding unit, in accordance with some embodiments of the present disclosure.

Process 300 of FIG. 3 illustrates exemplary actions for transforming audio data from a first format to a second format. At 302, the simplification unit 230 receives an audio signal, e.g., from the acoustic pre-processing unit 220. As discussed above, the audio signal received from the acoustic pre-processing unit 220 can be a signal that had noise and echo cancellation processing performed as well as channel down-mix and up-mix processing performed, e.g., reducing or increasing a number of audio channels. In some implementations, the simplification unit 230 receives acoustic metadata together with the audio signal. The acoustic metadata can include format indication, and other information as discussed above.

At 304, the simplification unit 230 determines whether the audio signal is in a first format that is supported or not supported by an encoding unit 240 of the audio device. For example, the audio format detection unit 232, as shown in FIG. 2A, can analyze the audio signal received from the acoustic pre-processing unit 220 and identify a format of the audio signal. If the audio format detection unit 232 determines that the audio signal is in a mono format or a stereo format the simplification unit 230 passes the signal to the encoding unit 240. However, if the audio format detection unit 232 determines that the signal is in a spatial format, the audio format detection unit 232 passes the audio signal to transform unit 234. In some implementations, the audio format detection unit 232 can use the acoustic metadata to determine the format of the audio signal.

In some implementations, the simplification unit 230 determines whether the audio signal is in the first format by determining a number, configuration or position of audio capture devices (e.g., microphones) used to capture the audio signal. For example, if the audio format detection unit 232 determines that audio signal is captured by a single capture device (e.g., single microphone), the audio format detection unit 232 can determine that it is a mono signal. If the audio format detection unit 232 determines that the audio signal is captured by two capture devices at a specific angle from each other, the audio format detection unit 232 can determine that the signal is a stereo signal.

Figure 4:
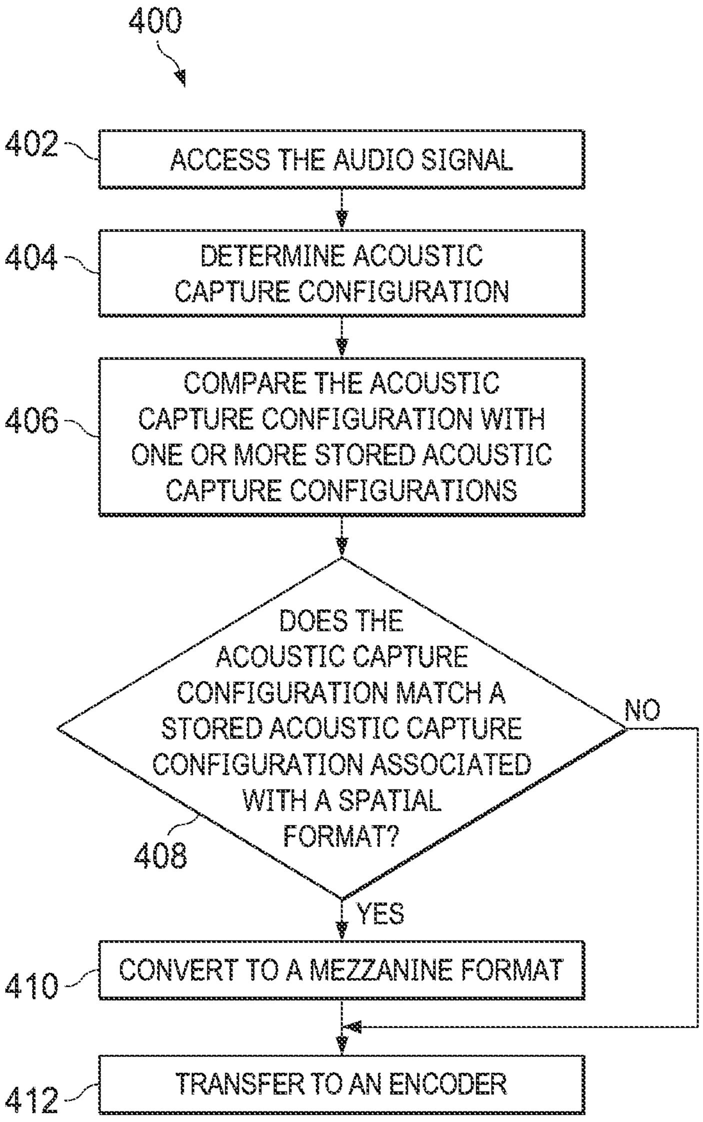
FIG. 4 is a flow diagram of exemplary actions for determining whether an audio signal is in a format supported by the encoding unit, in accordance with some embodiments of the present disclosure.

FIG. 4 is a flow diagram of exemplary actions for determining whether an audio signal is in a format supported by the encoding unit, in accordance with some embodiments of the present disclosure. At 402, the simplification unit 230 accesses the audio signal. For example, the audio format detection unit 232 can receive the audio signal as input. At 404, the simplification unit 230 determines the acoustic capture configuration of the audio device, e.g., a number of microphones and their positional configuration used to capture the audio signal. For example, the audio format detection unit 232 can analyze the audio signal and determine that three microphones were positioned at different locations within a space. In some implementations, the audio format detection unit 232 can use acoustic metadata to determine the acoustic capture configuration. That is, the acoustic pre-processing unit 220 can create acoustic metadata that indicates the position of each capture device and the number of capture devices. The metadata may also contain descriptions of detected audio properties, such as direction or directivity of a sound source. At 406, the simplification unit 230 compares the acoustic capture configuration with one or more stored acoustic capture configurations. For example, the stored acoustic capture configurations can include a number and position of each microphone to identify a specific configuration (e.g., mono, stereo, or spatial). The simplification unit 230 compares each of those acoustic capture configurations with the acoustic capture configuration of the audio signal.

At 408, the simplification unit 230 determines whether the acoustic capture configuration matches a stored acoustic capture configuration associated with a spatial format. For example, the simplification unit 230 can determine a number of microphones used to capture the audio signal and their locations in a space. The simplification unit 230 can compare that data with stored known configurations for spatial formats. If the simplification unit 230 determines that there is no match with a spatial format, which may be an indication that the audio format is mono or stereo, process 400 moves to 412, where the simplification unit 230 transfers the audio signal to an encoding unit 240. However, if the simplification unit 230 identifies the audio format as belonging to the set of spatial formats, process 400 moves to 410, where the simplification unit 230 converts the audio signal to a mezzanine format.

Referring back to FIG. 3, at 306, the simplification unit 230, in accordance with determining that the audio signal is in a format that is not supported by the encoding unit, converts the audio signal into a second format that is supported by the encoding unit. For example, the transform unit 234 can transform the audio signal into a mezzanine format. The mezzanine format accurately represents a spatial audio signal originally represented in any channel, object, and scene based format (or combination thereof). In addition, the mezzanine format can represent MASA, HTF or another suitable format. For example, a format that can serve as spatial mezzanine format can represent audio as m Objects and n-th order HOA ("mObj+HOAn"), where m and n are low integer numbers, including zero. The mezzanine format may thus entail representing the audio with waveforms (signals) and metadata that may capture explicit properties of the audio signal.

In some implementations, the transform unit 234, when converting the audio signal into the second format, generates metadata for the audio signal. The metadata may be associated with a portion of the audio signal in the second format, e.g., object metadata including positions of one or more objects. Another example is where the audio was captured using a proprietary set of capture devices and where the number and configuration of the devices is not supported or efficiently represented by the encoding unit and/or the mezzanine format. In such cases, the transform unit 234 can generate metadata. The metadata can include at least one of transform metadata or acoustic metadata. The transform metadata can include a metadata subset associated with a portion of the format that is not supported by the encoding process and/or the mezzanine format. For example, the transform metadata can include device settings for capture (e.g., microphone) configuration and/or device settings for output device (e.g., speaker) configuration when the audio signal is played back on a system that is configured to specifically output the audio captured by the proprietary configuration. The metadata, originating either from the acoustic pre-processing unit 220 and/or the transform unit 234, may also include acoustic metadata, which describes certain audio signal properties such as a spatial direction from which the captured sound arrives, a directivity or a diffuseness of the sound. In this example, there may be a determination that the audio is spatial, in spatial format, though represented as a mono or a stereo signal with additional metadata. In this case, the mono or stereo signals and the metadata are propagated to encoder 240.

At 308, the simplification unit 230 transfers the audio signal in the second format to the encoding unit. As illustrated in FIG. 2A, if the audio format detection unit 232 determines that the audio is in a mono or stereo format, the audio format detection unit 232 transfers the audio signal to the encoding unit. However, if the audio format detection unit 232 determines that the audio signal is in a spatial format, the audio format detection unit 232 transfers the audio signal to the transform unit 234. Transform unit 234, after transforming the spatial audio into, for example, the mezzanine format, transfers the audio signal to the encoding unit 240. In some implementations, the transform unit 234 transfers transform metadata and acoustic metadata, in addition to the audio signal, to the encoding unit 240.

The encoding unit 240 receives the audio signal in the second format (e.g., the mezzanine format) and encodes, the audio signal in the second format, into a transport format. The encoding unit 240 propagates the encoded audio signal to some sending entity that transmits it to a second device. In some implementations, the encoding unit 240 or subsequent entity stores the encoded audio signal for later transmission. The encoding unit 240 can receive the audio signal in mono, stereo or mezzanine format and encode those signals for audio transport. If the audio signal is in the mezzanine format and the encoding unit receives transform metadata and/or acoustic metadata from the simplification unit 230, the encoding unit transfers the transform metadata and/or acoustic metadata to the second device. In some implementations, the encoding unit 240, encodes the transform metadata and/or acoustic metadata into a specific signal that the second device can receive and decode. The encoding unit then outputs the encoded audio signal to audio transport to be transported to one or more other devices. Thus, each device (e.g., of devices in FIG. 1) is capable of encoding the audio signal in the second format (e.g., the mezzanine format), but the devices are generally not capable of encoding the audio signal in the first format.

In an embodiment, the encoding unit 240, (e.g., the previously described IVAS codec) operates on mono, stereo or spatial audio signals provided by the simplification stage. The encoding is made in dependency of a codec mode selection that can be based on one or more of the negotiated IVAS service level, the send and receive side device capabilities, and the available bit rate.

The service level can, for example, include IVAS stereo telephony, IVAS immersive conferencing, IVAS user-generated VR streaming, or another suitable service level. A certain audio format (mono, stereo, spatial) can be assigned to a specific IVAS service level for which a suitable mode of IVAS codec operation is chosen.

Furthermore, the IVAS codec mode of operation can be selected in response to send and receive side device capabilities. For example, depending on send device capabilities, the encoding unit 240 may be unable to access a spatial ingest signal, for example, because the encoding unit 240 is only provided with a mono or a stereo signal. In addition, an end-to-end capability exchange or a corresponding codec mode request can indicate that the receiving end has certain render limitations making it unnecessary to encode and transmit a spatial audio signal or, vice-versa. In another example, another device can request spatial audio.

In some implementations, an end-to-end capability exchange cannot fully resolve the remote device capabilities. For example, the encode point may not have information as to whether the decoding unit, sometimes referred to as a decoder, will be to a single mono speaker, stereo speakers or whether it will be binaurally rendered. The actual render scenario can vary during a service session. For example, the render scenario can change if the connected playback equipment changes. In an example, there may not be end-to-end capability exchange because the sink device is not connected during the IVAS encoding session. This can occur for voice mail service or in (user generated) Virtual Reality content streaming services. Another example where receive device capabilities are unknown or cannot be resolved due to ambiguities, is a single encoder that needs to support multiple endpoints. For instance, in an IVAS conference or Virtual Reality content distribution, one endpoint can be using a headset and another endpoint can be rendering to stereo speakers.

One way to address this problem is to assume the least possible receive device capability and to select a corresponding IVAS codec operation mode, which, in certain cases can be mono. Another way to address this problem is to require that the IVAS decoder, even if the encoder is operated in a mode supporting spatial or stereo audio, to deduct a decoded audio signal that can be rendered on devices with respectively lower audio capability. That is, a signal encoded as a spatial audio signal should also be decodable for both stereo and mono render. Likewise, a signal encoded as stereo should also be decodable for mono render.

For example, in IVAS conferencing, a call server should only need to perform a single encode and send the same encode to multiple endpoints, some of which can be binaural and some of which can be stereo. Thus, a single two channel encode can support both rendering on, for example, laptop 114 and conference room system 118 with stereo speakers and immersive rendering with binaural presentation on user device 110 and virtual reality gear 122. Thus, a single encode can support both outcomes simultaneously. As a result, one implication is that the two channel encode supports both stereo speaker playout and binaural rendered playout with a single encode.

Another example involves high quality mono extraction. The system can support extraction of a high-quality mono signal from an encoded spatial or stereo audio signal. In some implementations, it is possible to extract an Enhanced Voice Services ("EVS") codec bit stream for mono decoding, e.g. using the standard EVS decoder.

Alternatively or additionally to the service level and device capabilities, the available bit rate is another parameter that can control codec mode selection. In some implementations, the bit rate needs increase with the quality of experience that can be offered at the receiving end and with the associated number of components of the audio signal. At the lowest end bit rates, only mono audio rendering is possible. The EVS codec offers mono operation down to 5.9 kilobits per second. As bit rate increases, higher quality service can be achieved. However, Quality of Encoding ("QoE") remains limited due to mono-only operation and rendering. The next higher level of QoE is possible with (conventional) two-channel stereo. However, the system requires a higher bit rate than the lowest mono bit rate to offer useful quality, because there are now two audio signal components to be transmitted. Spatial sound experience requires higher QoE than stereo. At the lower end of the bit rate range, this experience can be enabled with a binaural representation of the spatial signal that can be referred to as "Spatial Stereo". Spatial Stereo relies on encoder-side binaural pre-rendering (with appropriate Head Related Transfer Functions ("HRTFs")) of the spatial audio signal ingest into the encoder (e.g., encoding unit 240) and is likely the most compact spatial representation because it is composed of only two audio component signals. Because Spatial Stereo carries more perceptual information, the bit rate required to achieve a sufficient quality is likely higher than the necessary bit rate for a conventional stereo signal. However, the spatial stereo representation can have limitations in relation to customization of rendering at the receiving end. These limitations can include a restriction to headphone render, to using a pre-selected set of HRTFs, or to render without head tracking. Even higher QoE at higher bit rates is enabled by a codec mode for encoding the audio signal in a spatial format that does not rely on binaural pre-rendering in the encoder and rather represents the ingested spatial mezzanine format. Depending on bit rate, the number of represented audio component signals of that format can be adjusted. For instance, this may result in a more or less powerful spatial representation ranging from the spatial-WXY to high-resolution spatial audio formats, as discussed above. This enables low to high spatial resolution depending on the available bit rate and offers the flexibility to address a large range of render scenarios, including binaural with head-tracking. This mode is referred to as "Versatile Spatial" mode.

In some implementations, the IVAS codec operates at the bit rates of the EVS codec, i.e. in a range from 5.9 to 128 kilobits per second. For low-rate stereo operation with transmission in bandwidth constrained environments, bit rates down to 13.2 kbps can be required. This requirement could be subject to technical feasibility using a particular IVAS codec and possibly still enable attractive IVAS service operation. For low-rate spatial stereo operation with transmission in bandwidth constrained environments, the lowest bit rates enabling spatial rendering and simultaneous stereo rendering can be possible down to 24.4 kilobits per second. For operation in versatile spatial mode, low spatial resolution (spatial-WXY, FOA) is likely possible down to 24.4 kilobits per second, at which, however, the audio quality could be achieved as with the spatial stereo operation mode.

Figure 2B:
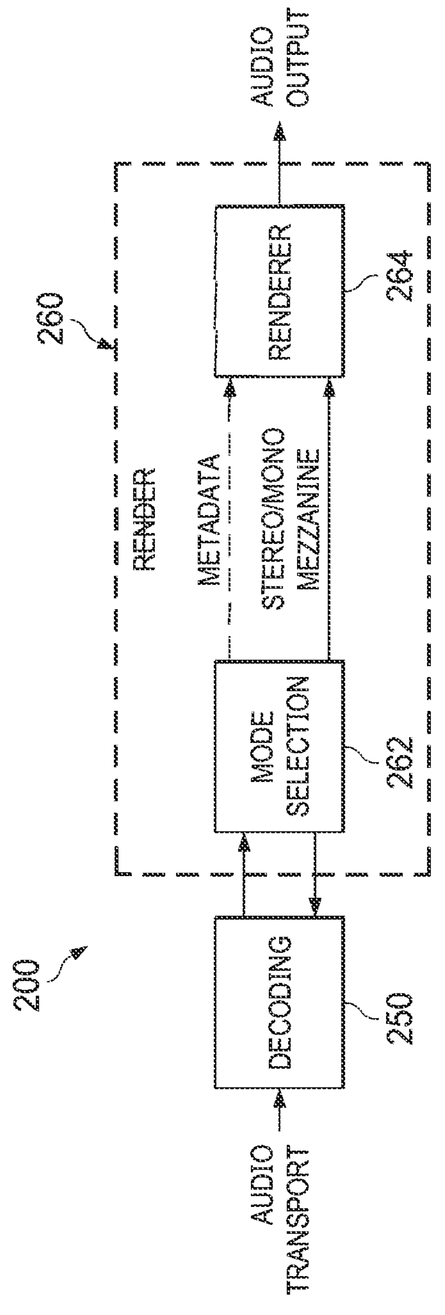
FIG. 2B is a block diagram of a system for transforming back captured audio to a suitable playback format, in accordance with some embodiments of the present disclosure.

Referring now to FIG. 2B, a receiving device receives an audio transport stream that includes the encoded audio signal. Decoding unit 250 of the receiving device receives the encoded audio signal (e.g., in a transport format as encoded by an encoder) and decodes it. In some implementations, the decoding unit 250 receives the audio signal encoded in one of four modes: mono, (conventional) stereo, spatial stereo or versatile spatial. The decoding unit 250 transfers the audio signal to the render unit 260. The render unit 260 receives the audio signal from the decoding unit 250 to render the audio signal. It is notable that there is generally no need to recover the original first spatial audio format ingested into the simplification unit 230. This enables significant savings in decoder complexity and/or memory footprint of an IVAS decoder implementation.

Figure 5:
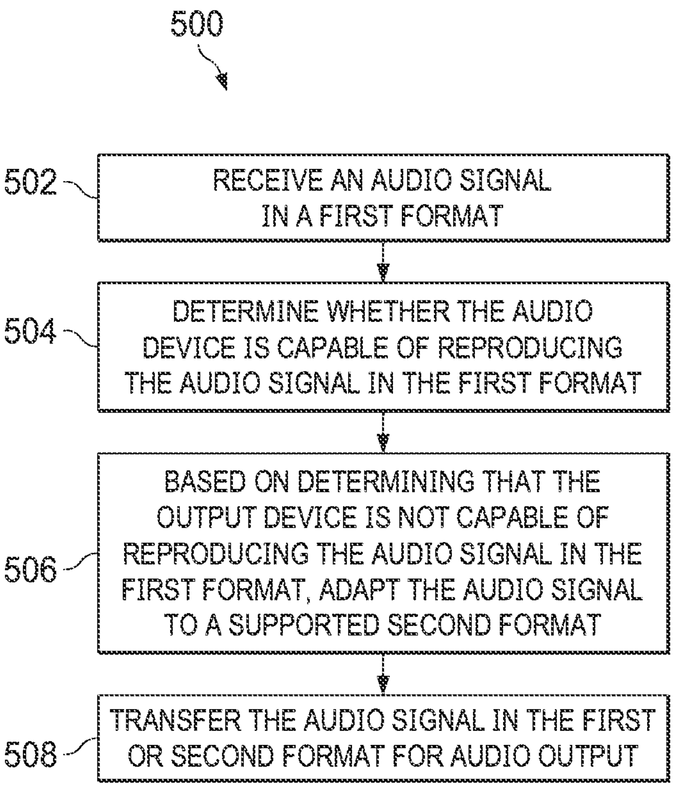
FIG. 5 is a flow diagram of exemplary actions for transforming an audio signal to an available playback format, in accordance with some embodiments of the present disclosure.

FIG. 5 is a flow diagram of exemplary actions for transforming an audio signal to an available playback format, in accordance with some embodiments of the present disclosure. At 502, the render unit 260 receives an audio signal in a first format. For example, the render unit 260 can receive the audio signal in the following formats: mono, conventional stereo, spatial stereo, versatile spatial. In some implementations, the mode selection unit 262 receives the audio signal. The mode selection unit 262 identifies the format of the audio signal. If the mode selection unit 262 determines that the format of the audio signal is supported by the playback configuration, the mode selection unit 262 transfers the audio signal to the renderer 264. However, if the mode selection unit determines that the audio signal is not supported, the mode selection unit performs further processing. In some implementations, the mode selection unit 262 selects a different decoding unit.

At 504, the render unit 260 determines whether the audio device is capable of reproducing the audio signal in a second format that is supported by the playback configuration. For example, the render unit 260 can determine (e.g., based on the number of speakers and/or other output devices and their configuration and/or metadata associated with the decoded audio) that the audio signal is in spatial stereo format, but the audio device is capable of playing back the received audio in mono only. In some implementations, not all devices in the system (e.g., as illustrated in FIG. 1) are capable of reproducing the audio signal in the first format, but all devices are capable of reproducing the audio signal in a second format.

At 506, the render unit 260, based on determining that the output device is capable of reproducing the audio signal in the second format, adapts the audio decoding to produce a signal in the second format. As an alternative, the render unit 260 (e.g., mode selection unit 262 or renderer 264) can use metadata, e.g., acoustic metadata, transform metadata, or a combination of acoustic metadata and transform metadata, to adapt the audio signal into the second format. At 508, the render unit 260 transfers the audio signal either in the supported first format or the supported second format for audio output (e.g., to a driver that interfaces with a speaker system).

In some implementations, the render unit 260 converts the audio signal into the second format by using metadata that includes a representation of a portion of the audio signal not supported by the second format in combination with the audio signal in the first format. For example, if the audio signal is received in a mono format and the metadata includes spatial format information, the render unit can convert the audio signal in the mono format into a spatial format using the metadata.

Figure 6:
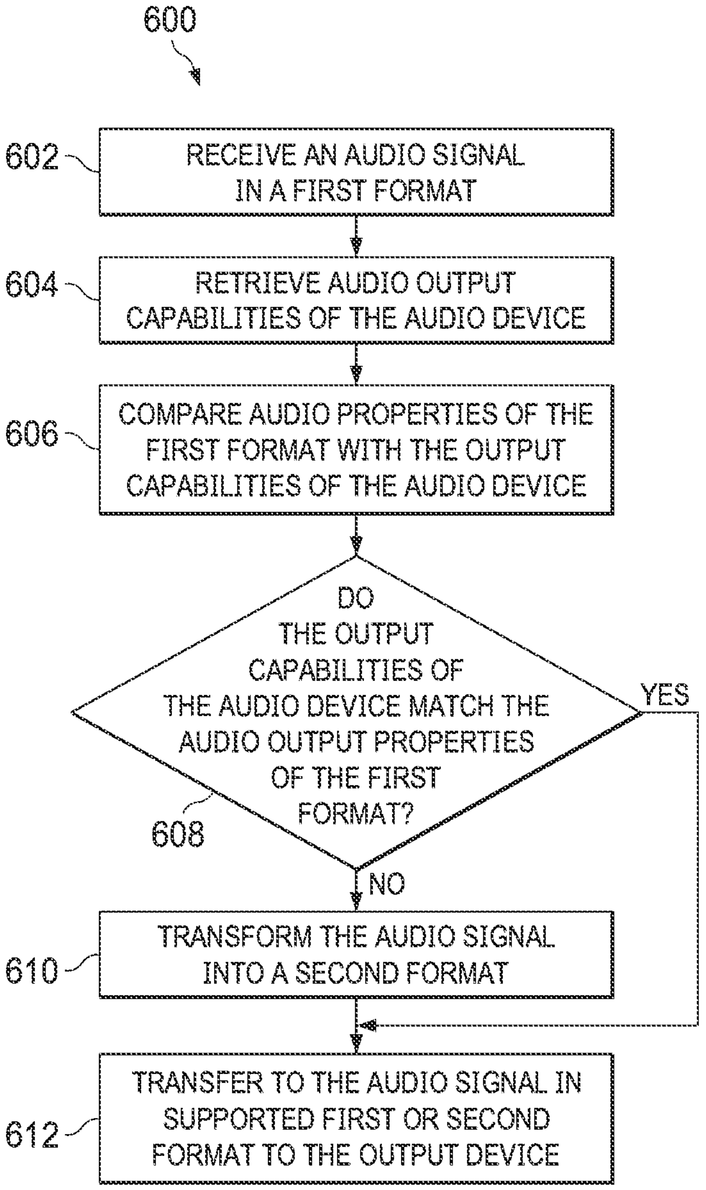
FIG. 6 is another flow diagram of exemplary actions for transforming an audio signal to an available playback format, in accordance with some embodiments of the present disclosure.

FIG. 6 is another block diagram of exemplary actions for transforming an audio signal to an available playback format, in accordance with some embodiments of the present disclosure. At 602, the render unit 260 receives an audio signal in a first format. For example, the render unit 260 can receive the audio signal in a mono, conventional stereo, spatial stereo or versatile spatial format. In some implementations, the mode selection unit 262 receives the audio signal. At 604, the render unit 260 retrieves the audio output capabilities (e.g., audio playback capabilities) of the audio device. For example, the render unit 260 can retrieve a number of speakers, their position configuration, and/or the configuration of other playback devices available for playback. In some implementations, mode selection unit 262 performs the retrieval operation.

At 606, the render unit 260 compares the audio properties of the first format with the output capabilities of the audio device. For example, the mode selection unit 262 can determine that the audio signal is in a spatial stereo format (e.g., based on acoustic metadata, transform metadata, or a combination of acoustic metadata and the transform metadata) and the audio device is able to playback the audio signal only in conventional stereo format over a stereo speaker system (e.g., based on speaker and other output device configuration). The render unit 260 can compare the audio properties of the first format with the output capabilities of the audio device. At 608, the render unit 260 determines whether the output capabilities of the audio device match the audio output properties of the first format. If the output capabilities of the audio device do not match the audio properties of the first format, process 600 moves to 610 where the render unit 260 (e.g., mode selection unit 262) performs actions to obtain the audio signal into a second format. For example, the render unit 260 may adapt the decoding unit 250 to decode the received audio in the second format or the render unit can use acoustic metadata, transform metadata, or a combination of acoustic metadata and the transform metadata to transform the audio from the spatial stereo format into the supported second format, which is conventional stereo in the given example. If the output capabilities of the audio device match the audio output properties of the first format, or after the transform operation 610, process 600 moves to 612, where the render unit 260 (e.g., using renderer 264) transfers the audio signal, which is now ensured to be supported, to the output device.

Figure 7:
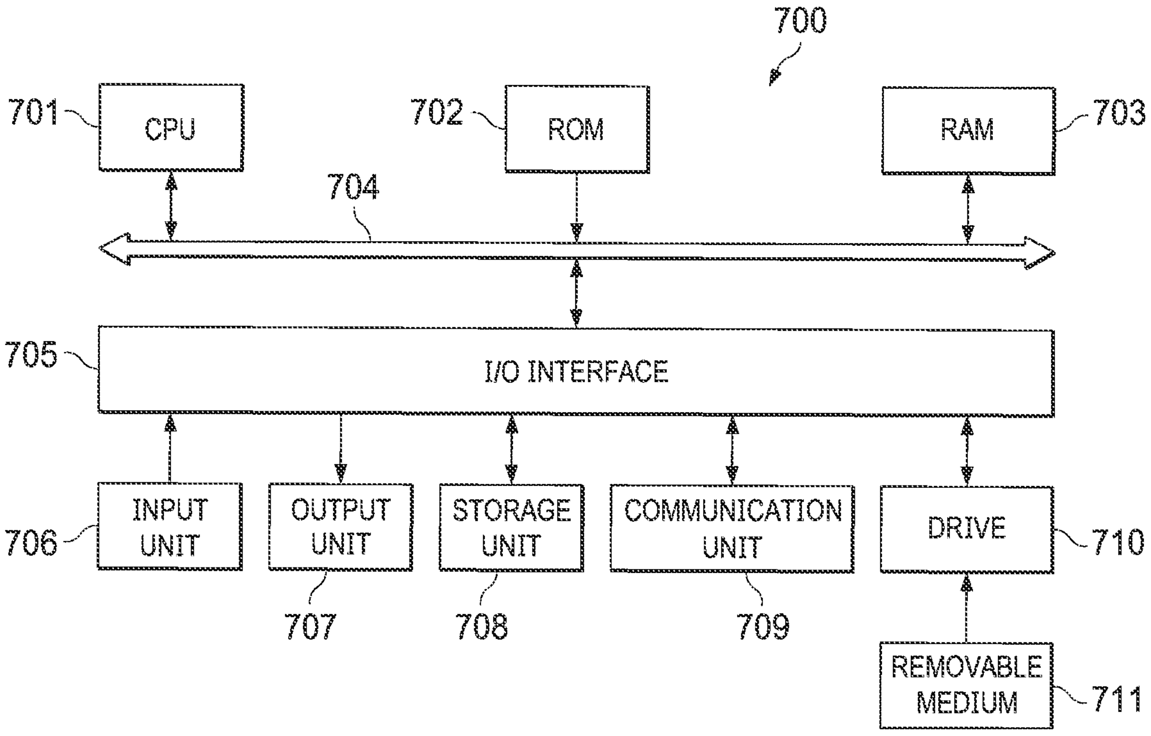
FIG. 7 is a block diagram of a hardware architecture for implementing the features described in reference to FIGS. 1-6, in accordance with some embodiments of the present disclosure.

FIG. 7 shows a block diagram of an example system 700 suitable for implementing example embodiments of the present disclosure. As shown, the system 700 includes a central processing unit (CPU) 701 which is capable of performing various processes in accordance with a program stored in, for example, a read only memory (ROM) 702 or a program loaded from, for example, a storage unit 708 to a random access memory (RAM) 703. In the RAM 703, the data required when the CPU 701 performs the various processes is also stored, as required. The CPU 701, the ROM 702 and the RAM 703 are connected to one another via a bus 704. An input/output (I/O) interface 705 is also connected to the bus 704.

The following components are connected to the I/O interface 705: an input unit 706, that may include a keyboard, a mouse, or the like; an output unit 707 that may include a display such as a liquid crystal display (LCD) and one or more speakers; the storage unit 708 including a hard disk, or another suitable storage device; and a communication unit 709 including a network interface card such as a network card (e.g., wired or wireless).

In some implementations, the input unit 706 includes one or more microphones in different positions (depending on the host device) enabling capture of audio signals in various formats (e.g., mono, stereo, spatial, immersive, and other suitable formats).

In some implementations, the output unit 707 include systems with various number of speakers. As illustrated in FIG. 1, the output unit 707 (depending on the capabilities of the host device) can render audio signals in various formats (e.g., mono, stereo, immersive, binaural, and other suitable formats).

The communication unit 709 is configured to communicate with other devices (e.g., via a network). A drive 710 is also connected to the I/O interface 705, as required. A removable medium 711, such as a magnetic disk, an optical disk, a magneto-optical disk, a flash drive or another suitable removable medium is mounted on the drive 710, so that a computer program read therefrom is installed into the storage unit 708, as required. A person skilled in the art would understand that although the system 700 is described as including the above-described components, in real applications, it is possible to add, remove, and/or replace some of these components and all these modifications or alteration all fall within the scope of the present disclosure.

In accordance with example embodiments of the present disclosure, the processes described above may be implemented as computer software programs or on a computer-readable storage medium. For example, embodiments of the present disclosure include a computer program product including a computer program tangibly embodied on a machine readable medium, the computer program including program code for performing methods. In such embodiments, the computer program may be downloaded and mounted from the network via the communication unit 709, and/or installed from the removable medium 711.

Generally, various example embodiments of the present disclosure may be implemented in hardware or special purpose circuits (e.g., control circuitry), software, logic or any combination thereof. For example, the simplification unit 230 and other units discussed above can be executed by the control circuitry (e.g., a CPU in combination with other components of FIG. 7), thus, the control circuitry may be performing the actions described in this disclosure. Some aspects may be implemented in hardware, while other aspects may be implemented in firmware or software which may be executed by a controller, microprocessor or other computing device (e.g., control circuitry). While various aspects of the example embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

Additionally, various blocks shown in the flowcharts may be viewed as method steps, and/or as operations that result from operation of computer program code, and/or as a plurality of coupled logic circuit elements constructed to carry out the associated function(s). For example, embodiments of the present disclosure include a computer program product including a computer program tangibly embodied on a machine readable medium, the computer program containing program codes configured to carry out the methods as described above.

In the context of the disclosure, a machine readable medium may be any tangible medium that may contain, or store a program for use by or in connection with an instruction execution system, apparatus, or device. The machine readable medium may be a machine readable signal medium or a machine readable storage medium. A machine readable medium may be non-transitory and may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Computer program code for carrying out methods of the present disclosure may be written in any combination of one or more programming languages. These computer program codes may be provided to a processor of a general purpose computer, special purpose computer, or other programmable data processing apparatus that has control circuitry, such that the program codes, when executed by the processor of the computer or other programmable data processing apparatus, cause the functions/operations specified in the flowcharts and/or block diagrams to be implemented. The program code may execute entirely on a computer, partly on the computer, as a stand-alone software package, partly on the computer and partly on a remote computer or entirely on the remote computer or server or distributed over one or more remote computers and/or servers.

What is claimed is:

1. A method comprising:

receiving, by a simplification stage from an acoustic pre-processing stage, audio signals in multiple formats and metadata of the audio signals, wherein the audio signals represent audio that has been captured by at least one microphone;

receiving, by the simplification stage from a device, attributes of the device, the attributes including one or more audio formats supported by the device, the one or more audio formats including a spatial audio format;

converting, by the simplification stage, the audio signals into a spatial mezzanine format that is compatible with the one or more audio formats; and providing, by the simplification stage, the converted audio signal to an encoding stage for downstream processing.

2. The method of claim 1, wherein the simplification stage comprises one or more computer processors a computer processor.

3. The method of claim 1, wherein the spatial mezzanine format includes a representation as m Objects and n-th order HOA (“mObj+HOAn”), where m and n are low integer numbers.

4. The method of claim 1, wherein the encoding stage is an immersive voice and audio services (IVAS) compliant processing stage.

5. A non-transitory computer-readable storage medium storing instructions that, when executed by one or more processors, cause the one or more processors to perform operations comprising:

receiving, by a simplification stage from an acoustic pre-processing stage, audio signals in multiple formats and metadata of the audio signals, wherein the audio signals represent audio that has been captured by at least one microphone;

receiving, by the simplification stage from a device, attributes of the device, the attributes including one or more audio formats supported by the device, the one or more audio formats including a spatial audio format;

converting, by the simplification stage, the audio signals into a spatial mezzanine format that is compatible with the one or more audio formats; and providing, by the simplification stage, the converted audio signal to an encoding stage for downstream processing.

6. A system comprising:

one or more processors; and a non-transitory computer-readable storage medium storing instructions that, when executed by the one or more processors, cause the one or more processors to perform operations comprising:

receiving, by a simplification stage from an acoustic pre-processing stage, audio signals in multiple formats and metadata of the audio signals, wherein the audio signals represent audio that has been captured by at least one microphone;

receiving, by the simplification stage from a device, attributes of the device, the attributes including one or more audio formats supported by the device, the one or more audio formats including a spatial audio format;

converting, by the simplification stage, the audio signals into a spatial mezzanine format that is compatible with the one or more audio formats; and providing, by the simplification stage, the converted audio signal to an encoding stage for downstream processing.

7. The method according to claim 1, further comprising:

when the one or more audio formats includes a mono format or a stereo format, bypassing the converting and providing the mono format or the stereo format to the encoding stage.

8. The method of claim 1, wherein converting the audio signal into the spatial mezzanine format comprises generating metadata for the audio signal, wherein the metadata comprises a representation of a portion of the audio signal.

9. The method of claim 8, further comprising transmitting the encoded audio signal by transmitting the metadata that comprises the representation of the portion of the audio signal.

10. The method of claim 1, wherein the spatial mezzanine format represents the audio signal as a number of audio objects in an audio scene both of which are relying on a number of audio channels for carrying spatial information.

11. The method of claim 10, wherein the spatial mezzanine format further comprises metadata for carrying a further portion of spatial information.

12. The non-transitory computer-readable storage medium of claim 5, wherein the spatial mezzanine format includes a representation as m Objects and n-th order HOA (“mObj+HOAn”), where m and n are low integer numbers.

13. The non-transitory computer-readable storage medium of claim 5, wherein the encoding stage is an immersive voice and audio services (IVAS) compliant processing stage.

14. The system of claim 6, wherein the spatial mezzanine format includes a representation as m Objects and n-th order HOA (“mObj+HOAn”), where m and n are low integer numbers.

15. The system of claim 6, wherein the encoding stage is an immersive voice and audio services (IVAS) compliant processing stage.

16. The system according to claim 6, further comprising:

when the one or more audio formats includes a mono format or a stereo format, bypassing the converting and providing the mono format or the stereo format to the encoding stage.

17. The system of claim 6, wherein converting the audio signal into the spatial mezzanine format comprises generating metadata for the audio signal, wherein the metadata comprises a representation of a portion of the audio signal.

18. The system of claim 17, further comprising transmitting the encoded audio signal by transmitting the metadata that comprises the representation of the portion of the audio signal.

19. The system of claim 6, wherein the spatial mezzanine format represents the audio signal as a number of audio objects in an audio scene both of which are relying on a number of audio channels for carrying spatial information.

20. The system of claim 19, wherein the spatial mezzanine format further comprises metadata for carrying a further portion of spatial information.

* * * * *